March 18, 1930.  F. L. SMITH ET AL  1,750,867
ADJUSTABLE MOLD FOR RETREADING TIRES
Filed Dec. 8, 1926  3 Sheets-Sheet 2

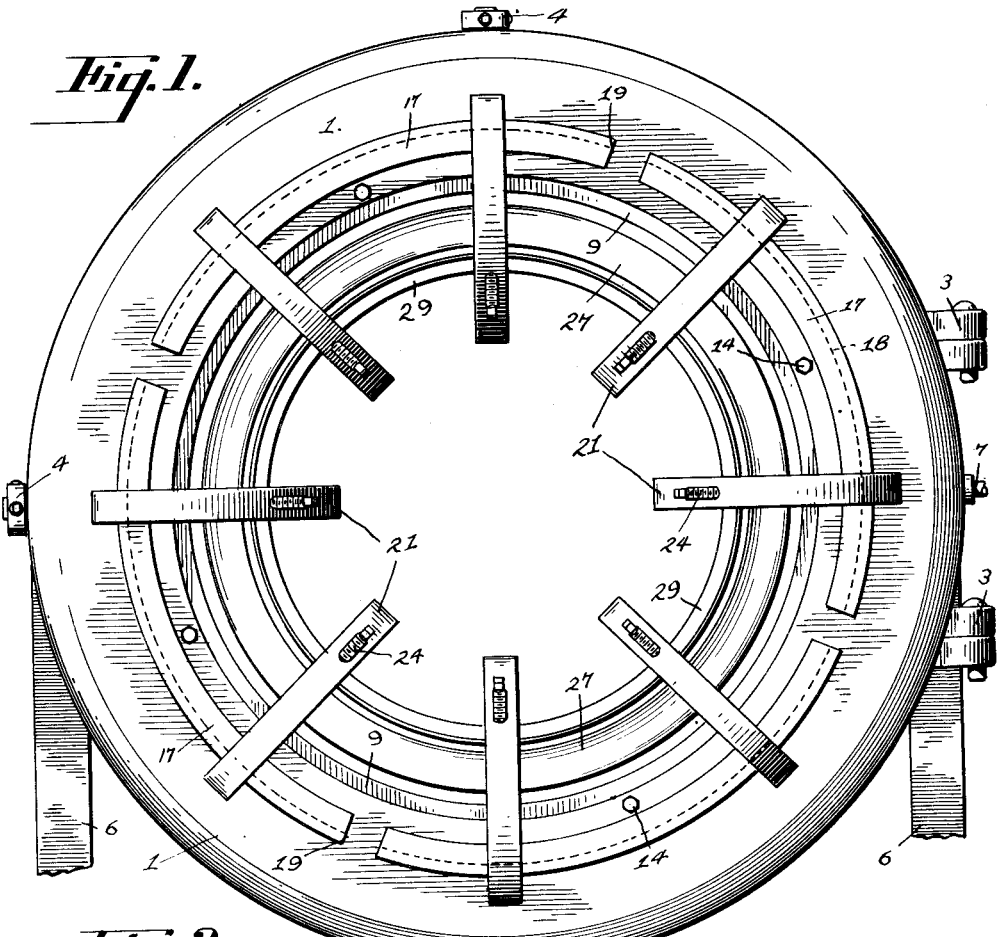
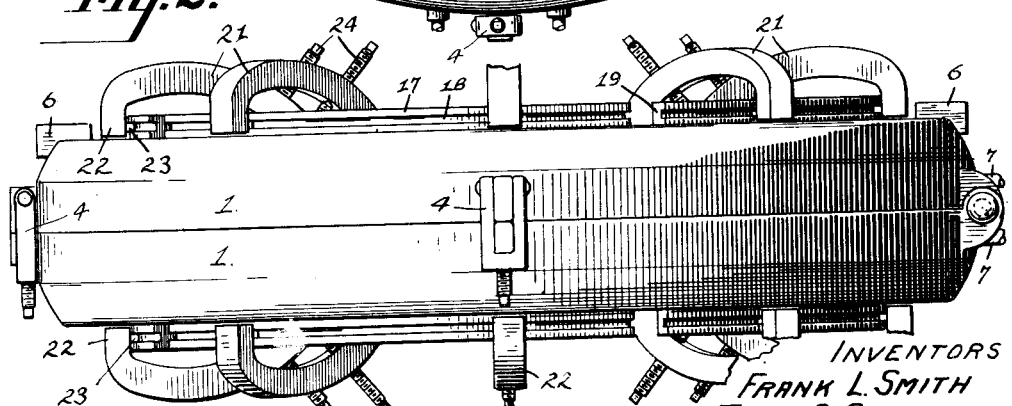

INVENTORS
FRANK L. SMITH
JACOB S. CAUFIELD
CHARLES J. PETERSON
BY
ATTY.

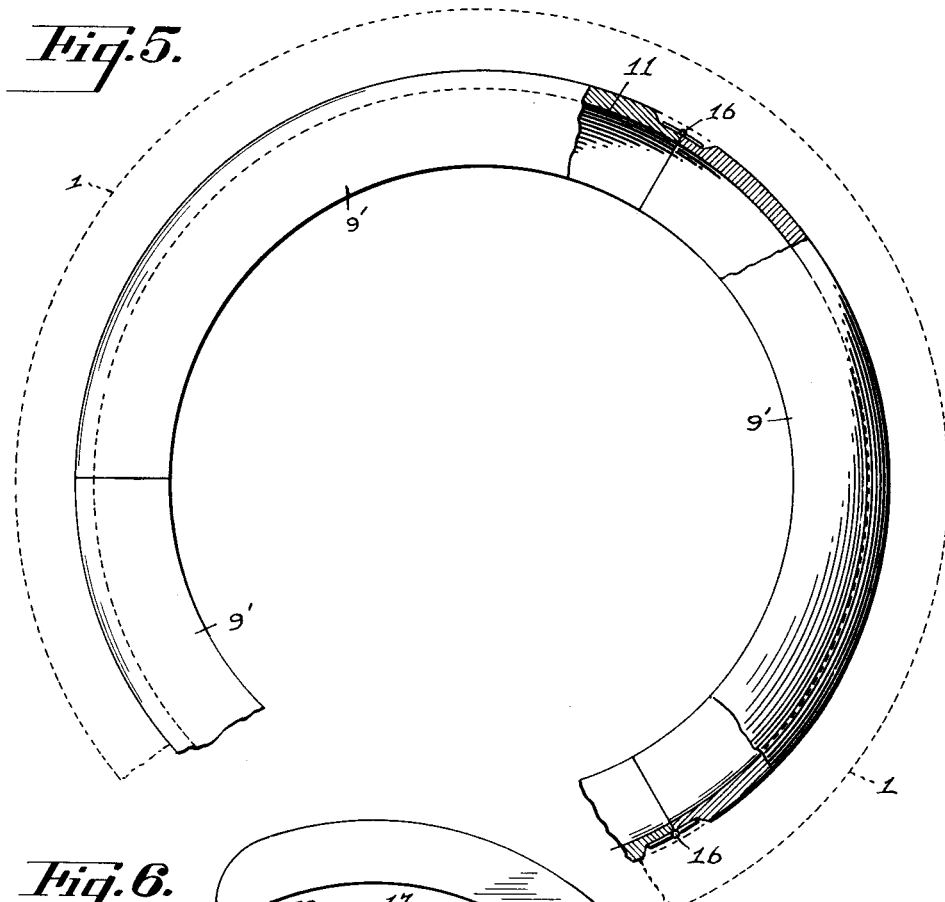
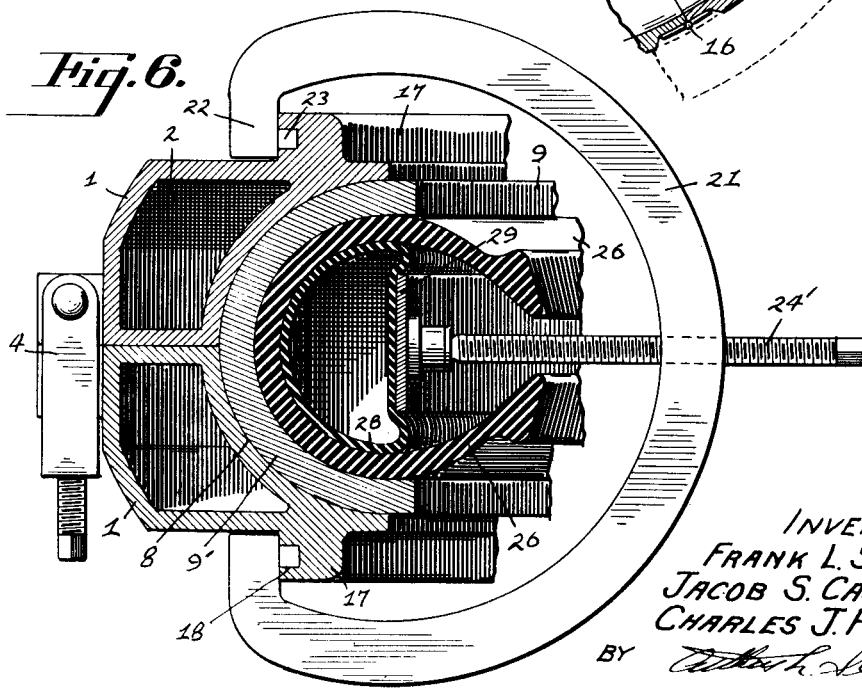

Patented Mar. 18, 1930

1,750,867

UNITED STATES PATENT OFFICE

FRANK L. SMITH, JACOB S. CAUFIELD, AND CHARLES J. PETERSON, OF SACRAMENTO, CALIFORNIA, ASSIGNORS, BY MESNE ASSIGNMENTS, TO SUPER MOLD CORPORATION, OF RENO, NEVADA, A CORPORATION OF NEVADA

ADJUSTABLE MOLD FOR RETREADING TIRES

Application filed December 8, 1926. Serial No. 153,272.

Our invention relates to improvements in molds for retreading automobile tires wherein a pair of matching mold sections having steam chambers formed therein and provided with tire expanding means, are arranged to receive matrices arranged to accommodate tires of various size for retreading, whereby a single set of steam chamber sections may be used for retreading tires of any size.

The present invention is directed to improvements in our retread mold for tires as disclosed in our co-pending application filed June 24, 1926, Serial No. 118,229.

The primary object of the present invention is to provide an improved mold adaptable for use with tires of various sizes.

Another object of the invention is to provide an improved device wherein matrices are constructed to accommodate tires of different sizes and arranged to be mounted in connection with a pair of mold sections having steam chambers formed therein whereby said mold sections may be adjusted to various sizes of tires.

A further object is to provide an improved device wherein sectional matrices are arranged to be interchangeably fitted into a pair of matching mold sections to receive tires of different size.

Another object is to provide an improved device of the character described wherein the matrix sections may be accurately and easily fitted into mold sections and readily interchanged.

A further object is to provide an improved device provided with improved means for expanding a tire against the inner surface of a matrix of proper size.

A still further object is to provide an improved mold of the character described which is simple and economical in construction and operation and which will avoid unnecessary duplication of machinery for retreading tires.

We accomplish these and other objects by means of the improved device disclosed in the drawings forming a part of the present application, like characters of reference being used to designate similar parts throughout the specification and drawings.

In the drawings,

Fig. 1 is a side elevation of our improved retreading mold.

Fig. 2 is a plan view of the mold as shown in Fig. 1.

Fig. 5 is a broken side elevation of a slightly modified form of matrix.

Fig. 6 is a sectional view similar to Fig. 3 and showing a modified form of tire expanding means.

Figure 3:
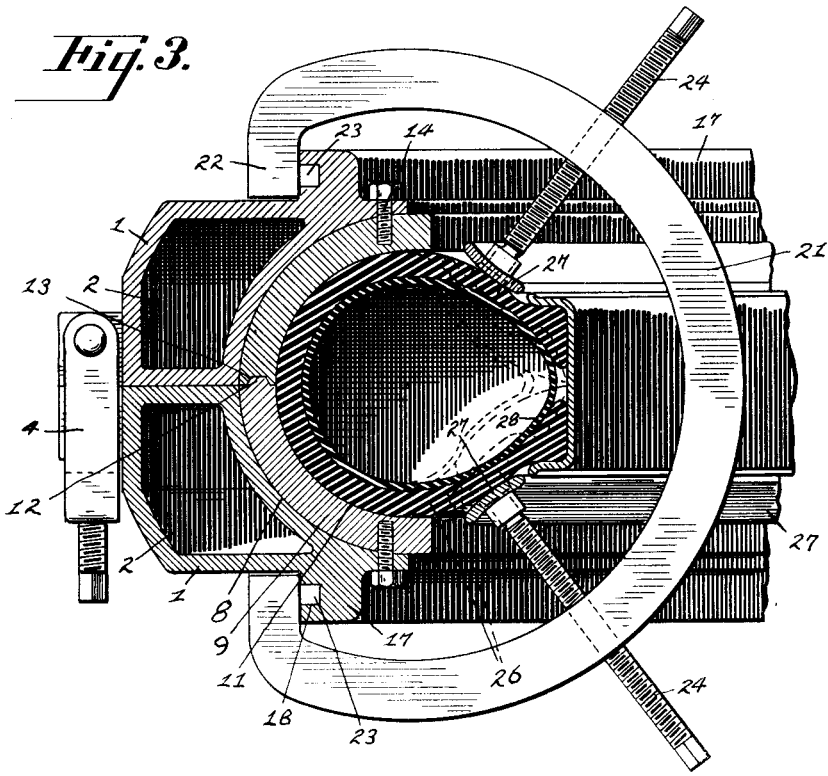
Fig. 3 is a transverse section through one side of the mold, showing the manner in which a tire is expanded against a matrix fitted within the mold, the figure being drawn upon a larger scale.
Figure 4:
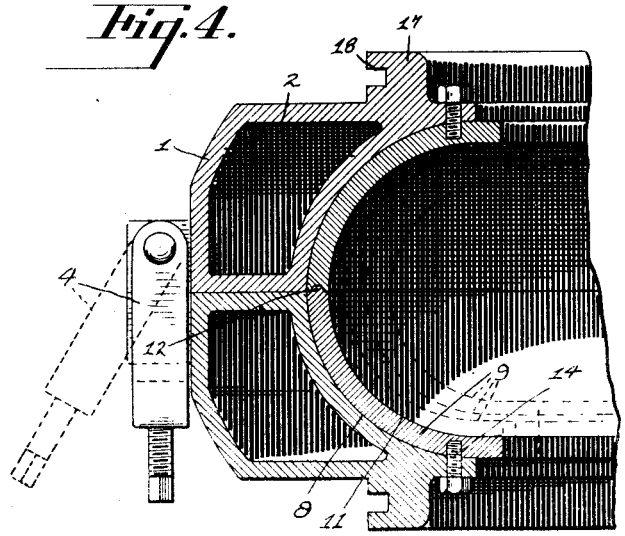
Fig. 4 is a section through a side of the mold showing the manner in which matrices of various size may be fitted into a common pair of steam chamber mold sections.

Referring to the drawings, the numeral 1 is used to designate a pair of matching annular mold sections having steam chambers 2 formed therein, said sections being pivotally connected at one side by means of suitable hinge mountings 3 and provided with a suitable clamping means 4 for clamping the sections into matching relation. One of the mold sections is secured in any convenient manner upon a suitable supporting frame 6, and the opposite section is arranged to swing outwardly upon the pivot mountings 3 which are preferably arranged upon a vertical axis. Steam is introduced into the steam chambers 2 through suitable flexible steam connections 7 connected into said chambers adjacent the pivot mountings 3.

The mold sections 2 are formed with concave recesses 8 upon the inner sides of the matching sections to form annular recesses substantially semi-circular in cross section and extending entirely around the inner surface of the mold sections 2. The recess is made of a size adapted to accommodate the largest size of tire in common usage. Within the recess is mounted a matrix 9 arranged to fit neatly into the mold sections and having its inner side recessed as at 11, to receive a tire of a specified size. A plurality of matrices 9 are constructed to fit the mold sections 2 interchangeably, each matrix 9 having the proper thickness and having its recess 11 shaped to accommodate a tire of a particular size, a matrix being constructed to fit each ordinary size of tire. The matrices are preferably formed in matching annular sections conforming to the mold sections 2 and having ribs 12 and grooves 13 formed upon opposite sections to insure proper alinement. The matrix sections may be detachably secured within the mold sections 2 by means of screws 14 or other suitable securing means as desired.

In Figs. 5 and 6 of the drawings, we have shown a modified form of matrix wherein each matrix is formed from arcuate sections 9 hingedly connected at adjacent ends, as at 16, the hinged sections being arranged to be opened to admit a tire. In this construction, the tire and matrix are inserted together into the mold sections 2 after the proper matrix has been applied around the tire to be retreaded.

The matching mold sections 2 have annular ribs 17 formed upon the outer sides thereof. Annular grooves 18 are formed in the outer circumferential face of each rib 17, and recesses 19 are formed through the ribs at spaced points. Yokes 21 having inwardly turned ends 22 provided with lugs 23 arranged to be moved into engagement with the ribs 17 through the recesses 19, the lugs 23 being slidably engaged by the grooves 18 whereby the yokes may be moved to desired positions around the mold. Members 24 are threaded through the yoke and provided with squared ends whereby said members may be moved to exert an expanding pressure against a tire for expanding the tread of the tire against the inner surface of a matrix.

In operation, the mold sections are swung open and a matrix 9 of proper size is fitted into the mold. A tire 26 is then introduced into the mold and the sections closed and clamped in closed relation by the clamping means 4. The yokes 21 are then moved onto the closed mold and the members 24 advanced to direct an expanding pressure against the tire. In the preferred construction illustrated in Fig. 3 of the drawings, the inner ends of the members 24 engage annular rings 27 applied against the side walls of the tire. An inner tube 28 is partially inflated within the tire casing 26. When the members 24 are now advanced, the rings 27 are pressed against the side walls of the casing, said side walls being pressed inwardly against the inflated tube and causing the tread of the tire to be expanded against the inner surface of the matrix. In this arrangement, the tire is mounted upon an ordinary tire rim 29 which serves to hold the tire in true annular form, while pressure is being applied from the sides at a suitable angle.

In the modified arrangement shown in Fig. 6 of the drawings, an expandible ring is applied against the inner tube 28 and pressure applied by a single row of members 24' entering the space between the edges of the tire.

After the tire has been introduced and expanded within the mold, steam is introduced into the mold sections 2 and the retreading operation carried out as in ordinary practice.

From the above explanation it will be seen that a single set of steam chamber mold sections 2 may be utilized in connection with a plurality of matrices for retreading any ordinary size of tire. The proper matrix for use with a particular size of tire may be readily selected and inserted into the mold and the retreading operation carried out in the usual manner to tread the entire circumference of the tire at one operation. The provision of a set of matrices is thus made sufficient for retreading all ordinary sizes of tire without duplicating the entire mold and steam chambers heretofore necessary. The improved expanding means simplifies the construction and operation of the mold and permits an efficient pressure to be applied with a minimum of time and effort.

While we have described our invention only as illustrated in the drawings, the device is, of course, subject to modification in numerous ways without departing from the spirit of the invention. We, therefore, do not wish to restrict ourselves to the specific constructions and arrangements shown and described, but desire to avail ourselves of all modifications which may fall within the scope of the appended claims.

Having thus described our invention what we claim as new and desire to secure by Letters Patent is,

1. A mold for retreading tires comprising a pair of matching mold sections having steam chambers formed therein; a sectional matrix fitted into the mold sections and arranged to receive a tire for retreading; annular ribs formed upon the outer sides of the mold sections; a plurality of yokes engaging the ribs; and means carried by the yokes and engaging the side walls of the tire for expanding the tread of the tire against the inner surface of the matrix.

2. A mold for retreading tires comprising a pair of matching mold sections having steam chambers formed therein; a sectional matrix fitted into the mold sections and arranged to receive a tire for retreading; annular ribs formed upon the outer sides of the mold sections; a plurality of yokes engaging the ribs; a pair of rings arranged to engage opposite sides of the tire; and means connected between the yokes and the rings for pressing the rings inwardly against the tire to expand the tread thereof against the inner surface of the matrix.

3. A mold for retreading tires comprising a pair of matching mold sections having steam chambers formed therein; a sectional matrix fitted into the mold sections and arranged to receive a tire to be retreaded; annular ribs formed upon the outer sides of the mold sections, said ribs having annular grooves formed therein and recesses formed in the edges of the ribs to communicate with said grooves; a plurality of yokes slidably engaging the ribs, said yokes being introduced into engagement with the grooves through the recesses; and means carried by the yokes and engaging the side walls of the tire for expanding the tread of a tire against the inner surface of the matrix.

4. A mold for retreading tires comprising a pair of matching mold sections having steam chambers formed therein and arranged to receive a tire for retreading; yoke retaining means formed upon the outer sides of the mold sections; a plurality of yokes engaging the retaining means; a pair of annular rings arranged to engage opposite sides walls of the tire; and means connected between the yokes and the rings for pressing the rings inwardly against the tire to expand the tread thereof against the inner surface of the matrix.

5. A mold for retreading tires comprising a pair of matching mold sections having steam chambers formed therein and arranged to receive a tire for retreading; yoke retaining means formed upon the outer sides of the mold sections; a plurality of yokes detachably engaging the retaining means; a pair of annular rings arranged to engage opposite side walls of the tire; and converging angularly disposed threaded members carried by the yokes for pressing the rings against the sides of the tires.

6. A mold for retreading tires comprising a pair of matching mold sections having steam chambers formed therein and arranged to receive a tire for retreading; annular ribs formed upon the outer sides of the mold sections; a plurality of yokes engaging the ribs; a pair of annular rings arranged to engage opposite side walls of the tire; and angularly disposed threaded members carried by the yokes for pressing the rings against the sides of the tire.

In witness whereof we hereunto set our signatures.

FRANK L. SMITH.
JACOB S. CAUFIELD.
CHARLES J. PETERSON.